UNITED STATES PATENT OFFICE.

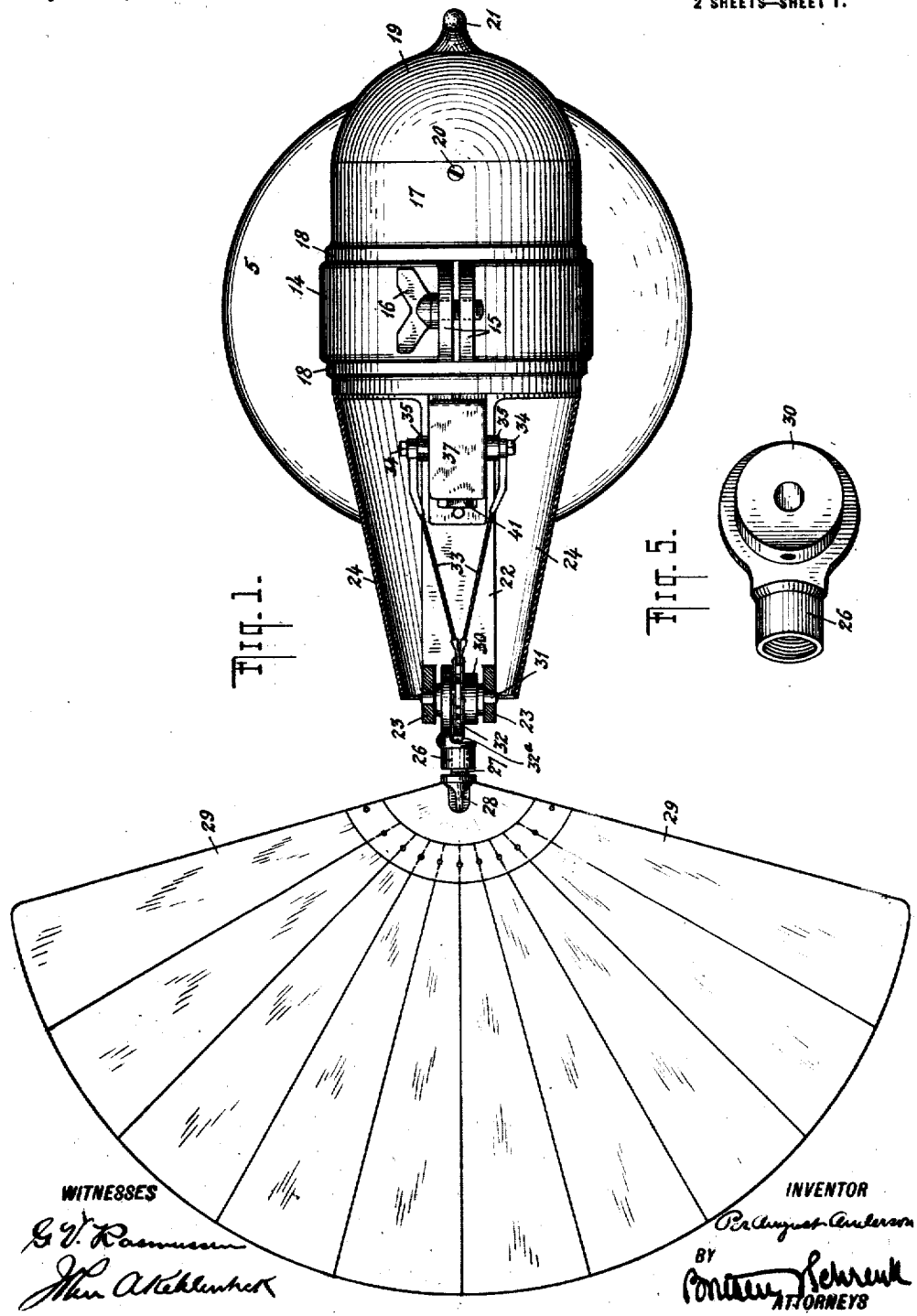

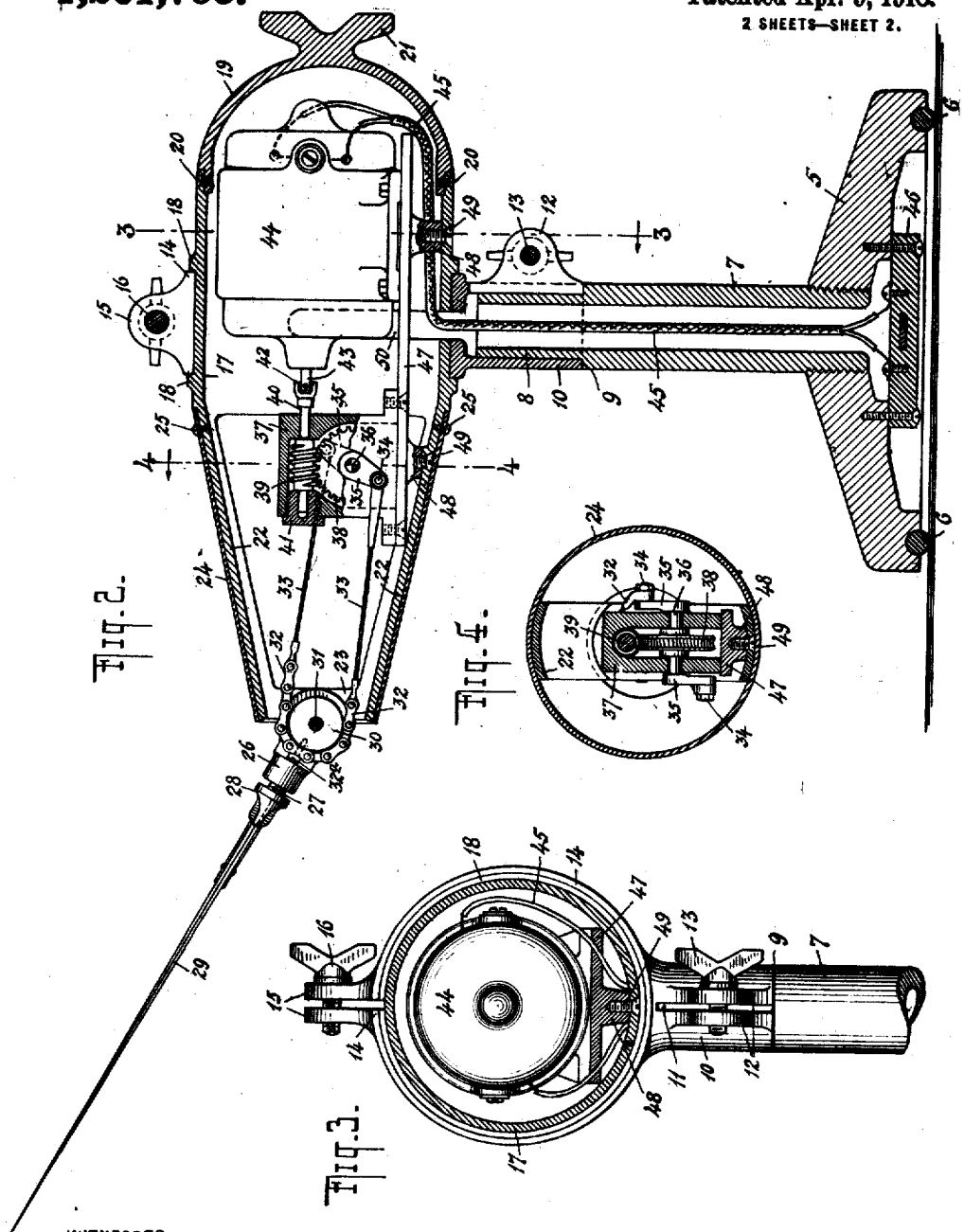

PER AUGUST ANDERSON, OF NEW YORK, N. Y.

FAN.

1,261,753.    Specification of Letters Patent.    Patented Apr. 9, 1918.

Application filed March 23, 1917. Serial No. 156,865.

*To all whom it may concern:*

Be it known that I, PER AUGUST ANDERSON, a citizen of the United States, and resident of the borough of Manhattan, city, county, and State of New York, have invented certain new and useful Improvements in Fans, of which the following is a specification.

My invention relates to power driven fans and more particularly to that type thereof in which the fan element itself oscillates instead of revolves. The object of my improvement is to provide a simple and efficient construction which may be readily shifted about from place to place and in which the fanning operation is absolutely noiseless and is performed without the creation of any objectionable air currents or drafts. My invention further contemplates a construction in which the parts may be adjusted so as to oscillate the fan element either in a vertical or a horizontal plane or in any intermediate plane as may be desired. My improvement will be fully described hereinafter and the features of novelty will be pointed out in the appended claims.

In the accompanying drawings, which for illustrative and descriptive purposes show an example of my invention, Figure 1 is a plan view partly in section; Fig. 2 is a sectional elevation; Fig. 3 is a section on the line 3—3 of Fig. 2; Fig. 4 is a section on the line 4—4 of Fig. 2; and Fig. 5 is an enlarged detail perspective view of the driving connection with the fan.

As shown in the illustrated example my improvement comprises a base 5 of any suitable form and dimensions and which may be provided with a rubber ring 6 or equivalent means whereby abrasion by the base of the surface upon which it rests is avoided. A tubular standard of any desired type, for instance in the form of an upright hollow rod 7, extends upwardly from the base 5 and is preferably detachably connected therewith as by screw-threading, the upper end of said rod 7 being of reduced diameter to form a neck 8 and annular shoulder 9 as shown in Fig. 2.

A sleeve 10 is mounted upon the neck 8 so as to rest upon the shoulder 9 and in the illustrated example is split as indicated at 11 and provided with lugs 12 having screw-threaded apertures for the accommodation of a thumb screw 13 whereby the sleeve 10 is secured against movement on said neck 8.

The sleeve 10 carries a split ring or collar 14 the axis of which extends at substantially right angles to the axis of the rod 7, said ring being also provided with lugs 15 having apertures for the accommodation of a thumb screw 16 whereby the ring or collar 14 is spread and contracted. A cylindrical hollow member 17 is mounted in the ring or collar 14, and is preferably provided with a pair of annular ribs 18 between which said collar fits and whereby relative movement between said casing and collar in an axial direction is prevented; the thumb screw 16 serves to clamp the member 17 firmly in the collar 14 when this is desired and also releases the same for the purpose of adjustment as will be more fully disclosed hereinafter. The one open end of the member 17 as shown, is closed by means of a cover 19 detachably or movably secured in position for instance by means of screws 20; said cover in the preferred form being provided with a manipulating knob or the like 21 as shown in Figs. 1 and 2. At its opposite end the member 17 is provided with a plurality of preferably integral arms 22 which extend outwardly from the member 17 in an axial direction and converge toward each other; the outer ends of said arms being connected together by spaced and parallel cross pieces 23. With this arrangement a tapering spider projects outwardly from one end of said member 17 with its free end in axial registry with the axis of said member 17 as shown in Fig. 2; in the normal condition of the parts this spider is covered by a tapering shell 24 which fits over the arms 22 and is detachably secured in position in any suitable manner as by means of screws 25. It will be seen that when combined the member 17, cover 19 and shell 24 together form a complete casing, having its one end closed and its other tapering end open as shown in Figs. 1 and 2.

The arrangement further includes a member 26 internally screw-threaded to receive the screw-threaded stem 27 of a head 28 to which a fan member 29 of any desired or well known construction is secured in any suitable manner. The member 26 projects radially outward from a driving drum 30 which is rotatably mounted between the cross-pieces 23 for instance on a rod 31 extending between said cross-pieces.

The means whereby said fan member 29 is oscillated on the pivot 31 may comprise various types of mechanism although I prefer to use the arrangement shown in the illustrated example. As shown a sprocket chain or its equivalent 32 extends about the drum 30 and is secured thereto at an intermediate point by means of a screw or the like 32ᵃ. The ends of said chain or the like 32 are connected respectively with links 33 which in turn are pivotally connected at 34 with cranks 35 located at opposite ends of a shaft 36 in off-set relation to each other. The shaft 36 is journaled in a housing 37 and carries a worm-wheel 38, which meshes with a worm-gear 39, the worm-wheel and worm-gear being both located within the housing 37 as shown in Figs. 2 and 4. The worm-gear 39 is carried by a shaft 40 one end of which is journaled in a cap 41 detachably combined with said housing 37 and the other end of which is rotatably mounted in and extends through said housing as shown in Fig 2. The projecting end of the shaft 40 is operatively connected at 42 with the power shaft 43 of an electric motor 44, the latter being connected by wires 45 which pass through the rod 7, with a rheostat or the like 46 controlled by means of a suitable switch and located in the base 5 and provided with suitable connections whereby the fan may be operatively connected with a source of electricity. The housing 37 and the motor 44 are both secured upon a platform 47 located within the casing and supported upon lugs 48 which are provided with screw-threaded recesses for the reception of screws 49 extending respectively through an arm 22 and the member 17 and whereby the platform 47 and with it the housing 37 and motor 44 are rigidly and securely fastened in operative position as a unit. In the preferred form the member 17 is constructed with a recess 50 extending circumferentially thereof throughout a part of its circumference for the purpose which will appear more clearly hereinafter.

In operation the motor 44 is electrically driven and drives the shaft 43 which in turn rotates the shaft 40 and worm gear 39, the latter communicating motion to the worm-wheel 38 and causing it to rotate about its axis. As the worm-wheel 38 is thus actuated the shaft 36 and cranks 35 will be similarly operated and will thus cause a pull to be alternately exerted on the links 33 and chain or the like 32 which pull in each case is communicated from opposite directions to the screw or the like 32ᵃ whereby the drum 30 is rocked upon the pivots 31 and thus oscillates the fan member 29. If the parts are in the positions shown in Figs. 1 and 2 the oscillation of said fan member will take place in a vertical plane; if it is desired to have said fan member 29 oscillated in a horizontal plane or in any intermediate plane, the thumb screw 16 is first loosened to release the grip of the collar 14 upon the member 17. The latter is then free to be rotated in said collar and about its own axis, for instance by means of the knob 21 through an arc of the extent necessary to bring about the desired adjustment of the fan member 29, the motor 44 and other mechanism within the casing being carried along as the latter is adjusted. As soon as the desired adjustment has been had the thumb screw 16 is again tightened to cause the collar 14 to again firmly grip the member 17; the slot 50 in said member 17 permits the described adjustments to be made without interference with the wires 45, it being understood that the latter are of sufficient length to accommodate themselves to any change in the position of the parts.

In any position the fan member 29 is oscillated to produce a gentle disturbance of the air whereby an air current is created which is cooling and beneficial and in no case constitutes a draft, the operation of the entire mechanism at all times being substantially noiseless. As a matter of fact the apparatus when in operation closely simulates the act of manually fanning one's self. The apparatus may be conveniently shifted about and may be readily placed in the most advantageous position at all times; it is simple in construction, reliable in operation and possesses all of the advantages of a revolving fan without any of the disadvantages thereof.

When it is desired to reach the interior of the casing the cover 19 and the shell 24 may be readily removed, the fan member 29 being first disconnected from the member 26 and the screws 25 removed to permit the shell 24 to slide from the arms without interference. After this has been done the interior of the casing and the mechanism therein are readily accessible. It will be seen that the housing 37 and motor 44 may be removed as a unit from the casing with the platform 47 by simply removing the screws 49 and then passing the unit comprising the housing 37, motor 44 and platform 47 through the open end of the casing which is normally closed by the cover 19. Prior to this removal the links 33 are disconnected from the cranks 35. By connecting the fan member 29 with the driving mechanism by means of the chain 32, links 33 and oppositely located off-set cranks 35 or in an equivalent manner, an absolute balance is secured and the oscillation of the fan member 29 is constant and smooth and free from jerks or the like whenever the mechanism is in operation.

Various changes in the specific form shown and described may be made within the scope of the claims without departing from the spirit of my invention.

I claim:
1. The combination of a support, a collar, a device carrying said collar mounted on said support and rotatable relatively thereto in a horizontal plane, means for securing said device in an adjusted position, a casing rotatably mounted in said collar and adjustable relatively thereto about an axis transverse to the axis of said support, means for clamping said casing in said collar, a fan member pivotally mounted on said casing and mechanism within said casing whereby said fan member is oscillated, said fan member and mechanism being movable with said casing whereby the plane of oscillation of said fan member is changed.

2. The combination of an upright support, a casing detachably connected with said support and tapering toward its one end, a cover movably mounted at the other end of said casing, a fan member pivotally mounted at the tapering end of said casing and actuating mechanism within said casing whereby said fan member is oscillated; said mechanism being removable as a unit from said casing.

3. The combination of a support, a casing carried thereby, a fan member pivotally mounted on said casing, a platform detachably secured in said casing, a motor mounted on said platform, driving mechanism operatively connected with said motor and carried by said platform, and means whereby said driving mechanism is operatively connected with said fan member to oscillate same, said motor, driving mechanism and platform being removable from said casing as a unit.

4. The combination of a support, a casing carried thereby, driving mechanism within said casing, a driven shaft operatively connected with said mechanism, off-set cranks carried by said shaft, a drum rotatably mounted on said casing, a fan member carried by said drum, a flexible member extending about said drum and secured thereto, and links connected with the free ends of said flexible member and with said cranks whereby said drum is rocked to oscillate said fan member.

5. The combination of an upright support, a casing connected therewith and including a tapering spider at one end, a fan member pivotally mounted at the free end of said spider, mechanism within said casing whereby said fan member is oscillated and a shell detachably connected with and covering said spider.

6. The combination of a casing, driving mechanism within said casing, a driven shaft operatively connected with said mechanism, off-set cranks carried by said shaft, a fan member pivotally mounted on said casing and means connecting said cranks and said fan member whereby the latter is oscillated.

In testimony whereof I have hereunto set my hand.

PER AUGUST ANDERSON.